US012677272B2

(12) United States Patent
Yang et al.

(10) Patent No.: US 12,677,272 B2
(45) Date of Patent: Jul. 7, 2026

(54) EXAMPLE PROCEDURES FOR PROCESSING OVERLAPPING UPLINK TRANSMISSIONS

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 17/963,503

(22) Filed: Oct. 11, 2022

(65) Prior Publication Data

US 2023/0109886 A1 Apr. 13, 2023

Related U.S. Application Data

(60) Provisional application No. 63/254,982, filed on Oct. 12, 2021.

(51) Int. Cl.
| | |
|---|---|
| *H04W 72/1268* | (2023.01) |
| *H04W 72/21* | (2023.01) |
| *H04W 72/23* | (2023.01) |
| *H04W 72/566* | (2023.01) |

(52) U.S. Cl.
CPC ....... *H04W 72/1268* (2013.01); *H04W 72/21* (2023.01); *H04W 72/23* (2023.01); *H04W 72/569* (2023.01)

(58) Field of Classification Search
None
See application file for complete search history.

(56) References Cited

U.S. PATENT DOCUMENTS

| | | | | |
|---|---|---|---|---|
| 2020/0314900 A1* | 10/2020 | Hosseini | | H04W 72/56 |
| 2023/0379920 A1* | 11/2023 | Deghel | | H04W 72/1268 |
| 2023/0413272 A1* | 12/2023 | Fu | | H04W 76/20 |

FOREIGN PATENT DOCUMENTS

CN 108702776 A 10/2018

OTHER PUBLICATIONS

3GPP TSG RAN WG1 #106bis-e, Uplink intra-UE multiplexing and prioritization, R1-2109484, Oct. 11-Oct. 19, 2021.*
3GPP TSG RAN WG1 #104-e, Uplink intra-UE multiplexing and prioritization, R1-2101204, Jan. 25-Feb. 5, 2021.*

(Continued)

*Primary Examiner* — Kouroush Mohebbi
(74) *Attorney, Agent, or Firm* — Patterson & Sheridan, L.L.P.

(57) ABSTRACT

Certain aspects of the present disclosure provide techniques for wireless communications by a UE. An example method by a user UE generally includes identifying overlapping uplink transmissions, performing a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities, and transmitting at least one of the overlapping uplink transmissions after performing the cancelation procedure.

23 Claims, 14 Drawing Sheets

(56)        References Cited

OTHER PUBLICATIONS

3GPP TS 38.213 version 16.2.0 Release 16, 5G, NR, Physical layer procedures for control, Jul. 2020.*
3GPP TSG RAN WG1 #106bis-e, Uplink intra-UE multiplexing and prioritization, R1-2109484, Oct. 11-Oct. 19, 2021 (Year: 2021).*
3GPP TSG RAN WG1 #104-e, Uplink intra-UE multiplexing and prioritization, R1-2101204, Jan. 25-Feb. 5, 2021 (Year: 2021).*
3GPP TS 38.213 version 16.2.0 Release 16, 5G, NR, Physical layer procedures for control, Jul. 2020 (Year: 2020).*
Zhao Qun, Information Multiplexing Transmission Method and Apparatus, and Information Receiving Method and Apparatus, Oct. 23, 2018, Espacenet (Year: 2018).*
3GPP TS 38.213: "3rd Generation Partnership Project, Technical Specification Group Radio Access Network, NR, Physical Layer Procedures for Control (Release 16)", 3GPP Standard, Technical Specification, 3GPP Mobile Competence Centre, 650, Route Des Lucioles, F-06921 Sophia-Antipolis Cedex, France, vol. RAN WG1, No. V16.2.0, Jul. 20, 2020, pp. 1-176, XP051925548, Section 9, Second Paragraph, p. 53, Section 11.2A, p. 137, Last Paragraph Section 9.1.2.2, p. 63, Ln 32-34, Sec 9.1.3.1, p. 63, Last Paragraph.
International Search Report and Written Opinion—PCT/US2022/046374—ISA/EPO—Jan. 31, 2023.
SAMSUNG: "Uplink Intra-UE Multiplexing and Prioritization", R1-2109484, 3GPP TSG RAN WG1 #106bis-e, 3GPP, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, XP052058430, pp. 1-16, Section "2.1 Intra-UE multiplexing", p. 10, Ln 30-32, p. 8, Ln 16-17, p. 10, Ln 34, p. 10, Ln 35, Proposal 26, p. 13, Proposal 27, p. 14, Proposal 19, p. 11, Ln 21-23, p. 10, Ln 11, Proposal 16, p. 10, p. 8, Ln 23, Fig 4, p. 7, Ln 24-25, p. 7, Ln 32-35.

* cited by examiner

600

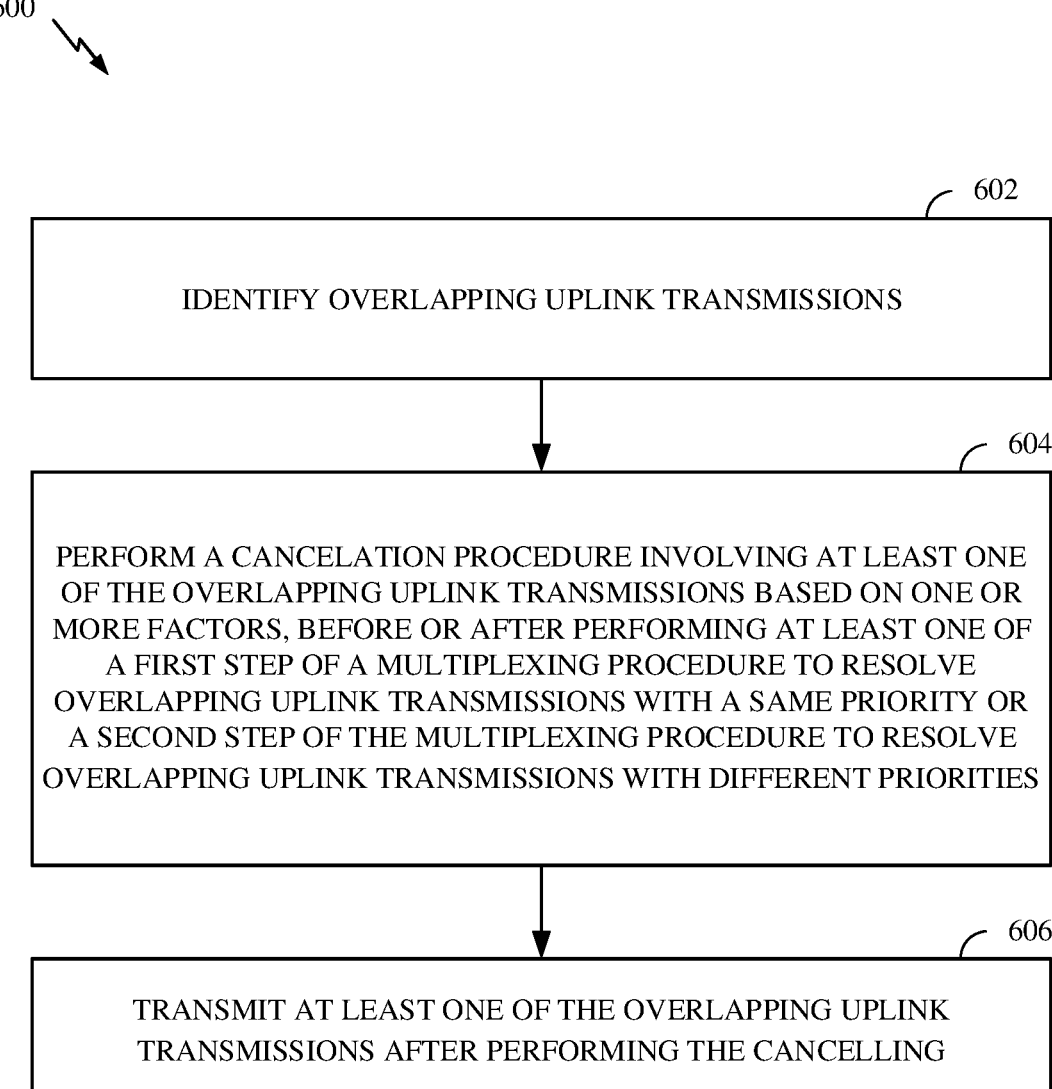

602

IDENTIFY OVERLAPPING UPLINK TRANSMISSIONS

604

PERFORM A CANCELATION PROCEDURE INVOLVING AT LEAST ONE OF THE OVERLAPPING UPLINK TRANSMISSIONS BASED ON ONE OR MORE FACTORS, BEFORE OR AFTER PERFORMING AT LEAST ONE OF A FIRST STEP OF A MULTIPLEXING PROCEDURE TO RESOLVE OVERLAPPING UPLINK TRANSMISSIONS WITH A SAME PRIORITY OR A SECOND STEP OF THE MULTIPLEXING PROCEDURE TO RESOLVE OVERLAPPING UPLINK TRANSMISSIONS WITH DIFFERENT PRIORITIES

606

TRANSMIT AT LEAST ONE OF THE OVERLAPPING UPLINK TRANSMISSIONS AFTER PERFORMING THE CANCELLING

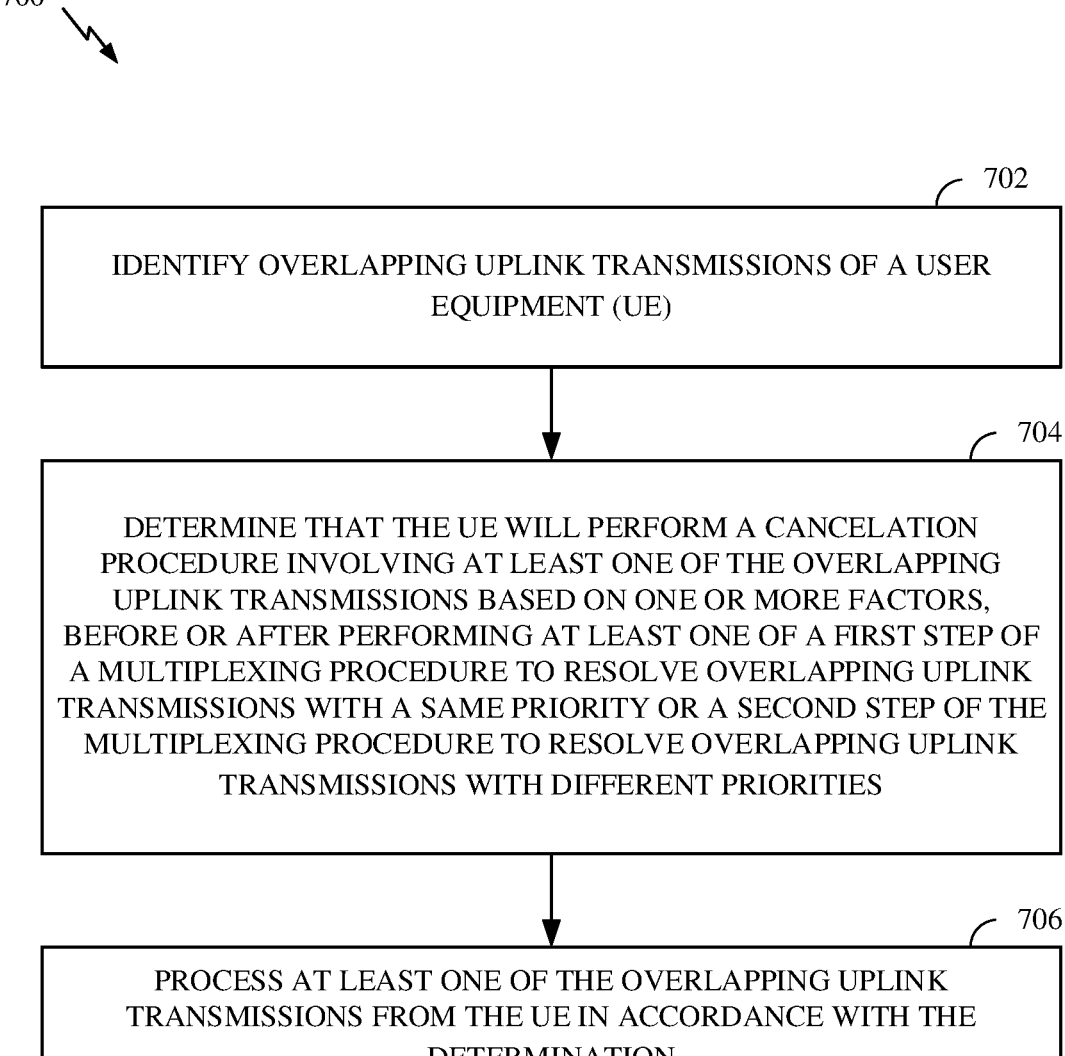

702

IDENTIFY OVERLAPPING UPLINK TRANSMISSIONS OF A USER EQUIPMENT (UE)

704

DETERMINE THAT THE UE WILL PERFORM A CANCELATION PROCEDURE INVOLVING AT LEAST ONE OF THE OVERLAPPING UPLINK TRANSMISSIONS BASED ON ONE OR MORE FACTORS, BEFORE OR AFTER PERFORMING AT LEAST ONE OF A FIRST STEP OF A MULTIPLEXING PROCEDURE TO RESOLVE OVERLAPPING UPLINK TRANSMISSIONS WITH A SAME PRIORITY OR A SECOND STEP OF THE MULTIPLEXING PROCEDURE TO RESOLVE OVERLAPPING UPLINK TRANSMISSIONS WITH DIFFERENT PRIORITIES

706

PROCESS AT LEAST ONE OF THE OVERLAPPING UPLINK TRANSMISSIONS FROM THE UE IN ACCORDANCE WITH THE DETERMINATION

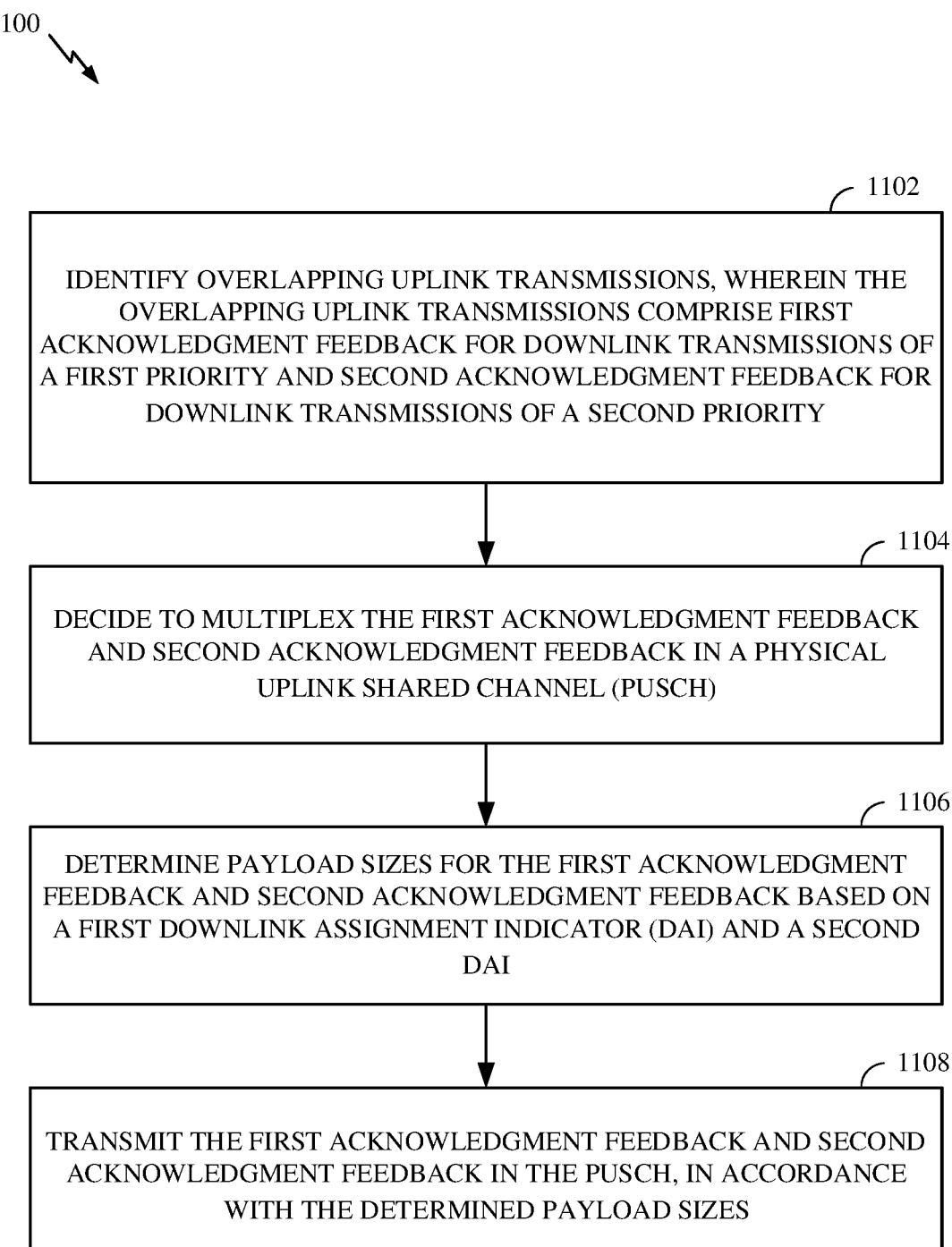

1102

IDENTIFY OVERLAPPING UPLINK TRANSMISSIONS, WHEREIN THE OVERLAPPING UPLINK TRANSMISSIONS COMPRISE FIRST ACKNOWLEDGMENT FEEDBACK FOR DOWNLINK TRANSMISSIONS OF A FIRST PRIORITY AND SECOND ACKNOWLEDGMENT FEEDBACK FOR DOWNLINK TRANSMISSIONS OF A SECOND PRIORITY

1104

DECIDE TO MULTIPLEX THE FIRST ACKNOWLEDGMENT FEEDBACK AND SECOND ACKNOWLEDGMENT FEEDBACK IN A PHYSICAL UPLINK SHARED CHANNEL (PUSCH)

1106

DETERMINE PAYLOAD SIZES FOR THE FIRST ACKNOWLEDGMENT FEEDBACK AND SECOND ACKNOWLEDGMENT FEEDBACK BASED ON A FIRST DOWNLINK ASSIGNMENT INDICATOR (DAI) AND A SECOND DAI

1108

TRANSMIT THE FIRST ACKNOWLEDGMENT FEEDBACK AND SECOND ACKNOWLEDGMENT FEEDBACK IN THE PUSCH, IN ACCORDANCE WITH THE DETERMINED PAYLOAD SIZES

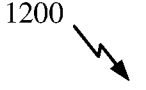

1202

IDENTIFY OVERLAPPING UPLINK TRANSMISSIONS, WHEREIN THE OVERLAPPING UPLINK TRANSMISSIONS COMPRISE FIRST ACKNOWLEDGMENT FEEDBACK FOR DOWNLINK TRANSMISSIONS OF A FIRST PRIORITY AND SECOND ACKNOWLEDGMENT FEEDBACK FOR DOWNLINK TRANSMISSIONS OF A SECOND PRIORITY

1204

DETERMINE THAT THE UE WILL MULTIPLEX THE FIRST ACKNOWLEDGMENT FEEDBACK AND SECOND ACKNOWLEDGMENT FEEDBACK IN A PHYSICAL UPLINK SHARED CHANNEL (PUSCH), WITH PAYLOAD SIZES FOR THE FIRST ACKNOWLEDGMENT FEEDBACK AND SECOND ACKNOWLEDGMENT FEEDBACK DETERMINED BASED ON A FIRST DOWNLINK ASSIGNMENT INDICATOR (DAI) AND A SECOND DAI

1206

PROCESS THE FIRST ACKNOWLEDGMENT FEEDBACK AND SECOND ACKNOWLEDGMENT FEEDBACK MULTIPLEXED IN THE PUSCH, IN ACCORDANCE WITH THE DETERMINED PAYLOAD SIZES

FIG. 12

EXAMPLE PROCEDURES FOR PROCESSING OVERLAPPING UPLINK TRANSMISSIONS

CROSS-REFERENCE TO RELATED APPLICATIONS

This application claims priority to U.S. Provisional Application No. 63/254,982, filed Oct. 12, 2021, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for multiplexing uplink transmissions from a user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure may provide advantages, such as improved coverage enhancement for random access procedures.

Certain aspects provide a method for wireless communication by a user equipment (UE). The method generally includes identifying overlapping uplink transmissions, performing a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities, and transmitting at least one of the overlapping uplink transmissions after performing the cancelation procedure.

Certain aspects provide a method for wireless communication by a network entity. The method generally includes identifying overlapping uplink transmissions of a user equipment (UE), determining that the UE will perform a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities, and processing at least one of the overlapping uplink transmissions from the UE in accordance with the determination.

Certain aspects provide a method for wireless communication by a user equipment (UE). The method generally includes identifying overlapping uplink transmissions, wherein the overlapping uplink transmissions comprise first acknowledgment feedback for downlink transmissions of a first priority and second acknowledgment feedback for downlink transmissions of a second priority, deciding to multiplex the first acknowledgment feedback and second acknowledgment feedback in a physical uplink shared channel (PUSCH), determining payload sizes for the first acknowledgment feedback and second acknowledgment feedback based on a first downlink assignment indicator (DAI) and a second DAI, and transmitting the first acknowledgment feedback and second acknowledgment feedback in the PUSCH, in accordance with the determined payload sizes.

Certain aspects provide a method for wireless communication by a network entity. The method generally includes identifying overlapping uplink transmissions, wherein the overlapping uplink transmissions comprise first acknowledgment feedback for downlink transmissions of a first priority and second acknowledgment feedback for downlink transmissions of a second priority, determining that the UE will multiplex the first acknowledgment feedback and second acknowledgment feedback in a physical uplink shared channel (PUSCH), with payload sizes for the first acknowledgment feedback and second acknowledgment feedback determined based on a first downlink assignment indicator (DAI) and a second DAI, and processing the first acknowledgment feedback and second acknowledgment feedback multiplexed in the PUSCH, in accordance with the determined payload sizes.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates example operations for wireless communication by a UE, in accordance with certain aspects of the present disclosure.

FIG. 7 illustrates example operations for wireless communication by a network entity, in accordance with certain aspects of the present disclosure.

FIG. 11 illustrates example operations for wireless communication by a UE, in accordance with certain aspects of the present disclosure.

FIG. 12 illustrates example operations for wireless communication by a network entity, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for processing overlapping uplink transmissions from a user equipment (UE). For example, various uplink channels, such as physical uplink shared channels (PUSCHs) and physical uplink control channels (PUCCHs) may overlap in time, for various reasons.

In conventional systems, a UE may apply what may be referred to as an intra-UE multiplexing or prioritization procedure to determine which of the overlapping uplink transmissions, if any, to transmit. According to such a procedure (e.g., in NR-Rel 17), the UE may perform a first step to resolve overlapping transmissions having the same priority, then perform a second step to resolve overlapping transmissions having different priorities.

Figure 4A:
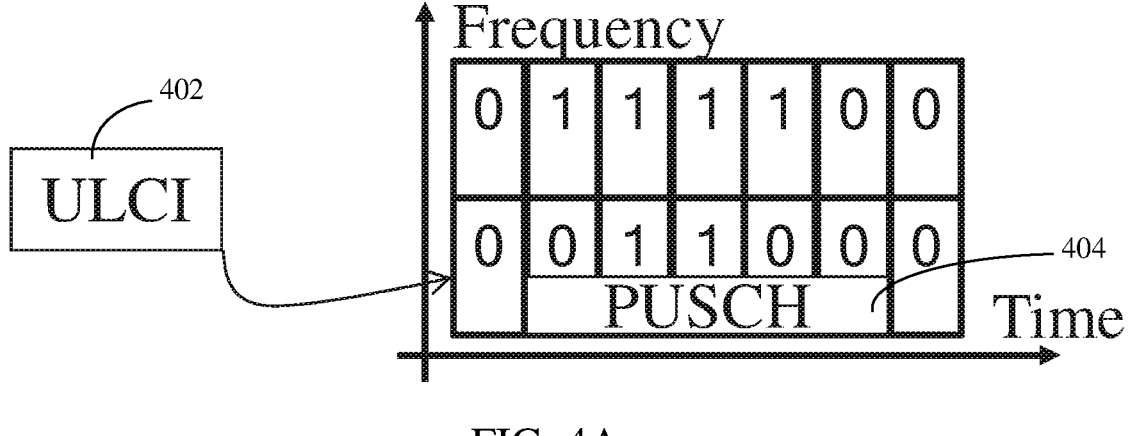
FIG. 4A and FIG. 4B illustrate example factors that may impact transmission of uplink channels.
Figure 4B:
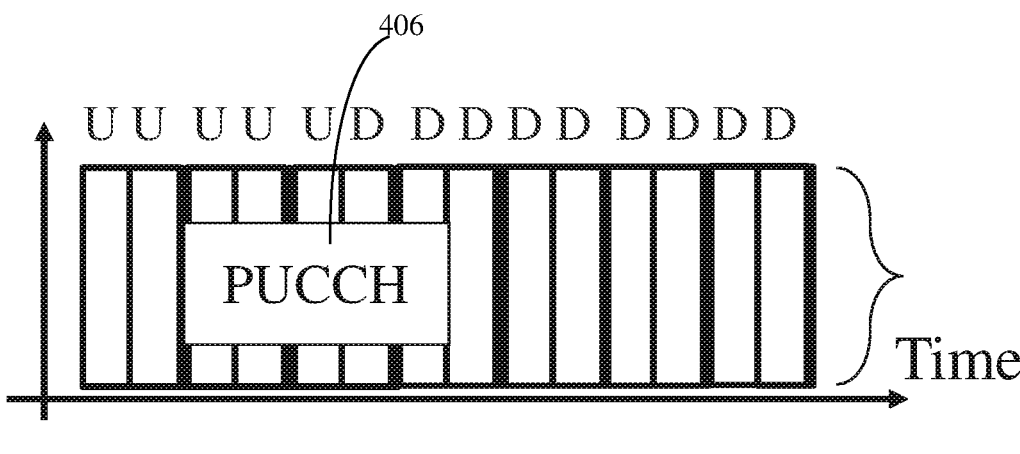

Besides overlapping on uplink resources, various other factors may impact the transmission of uplink channels. For example, as illustrated in FIG. 4A, an uplink cancellation indication (ULCI) 402 may be signaled from the network (e.g., a gNB) to the UE in order to (at least partially) cancel a PUSCH transmission 404. As another example, as illustrated in FIG. 4B, some uplink transmissions might get canceled due to time division duplexing (TDD) conflicts. In the illustrated example, a PUCCH transmission 406 overlaps with one or more symbols potentially designated ("D") for downlink. As another example, as in the examples shown in FIGS. 5A-5C, a PUSCH 502/506 associated with a configured grant (CG) may conflict with a PUSCH 504/508 scheduled via a dynamic grant (DG) and simultaneous transmission of CG and DG PUSCHs may be prohibited.

Figures 5A, 5B, 5C, 5D:
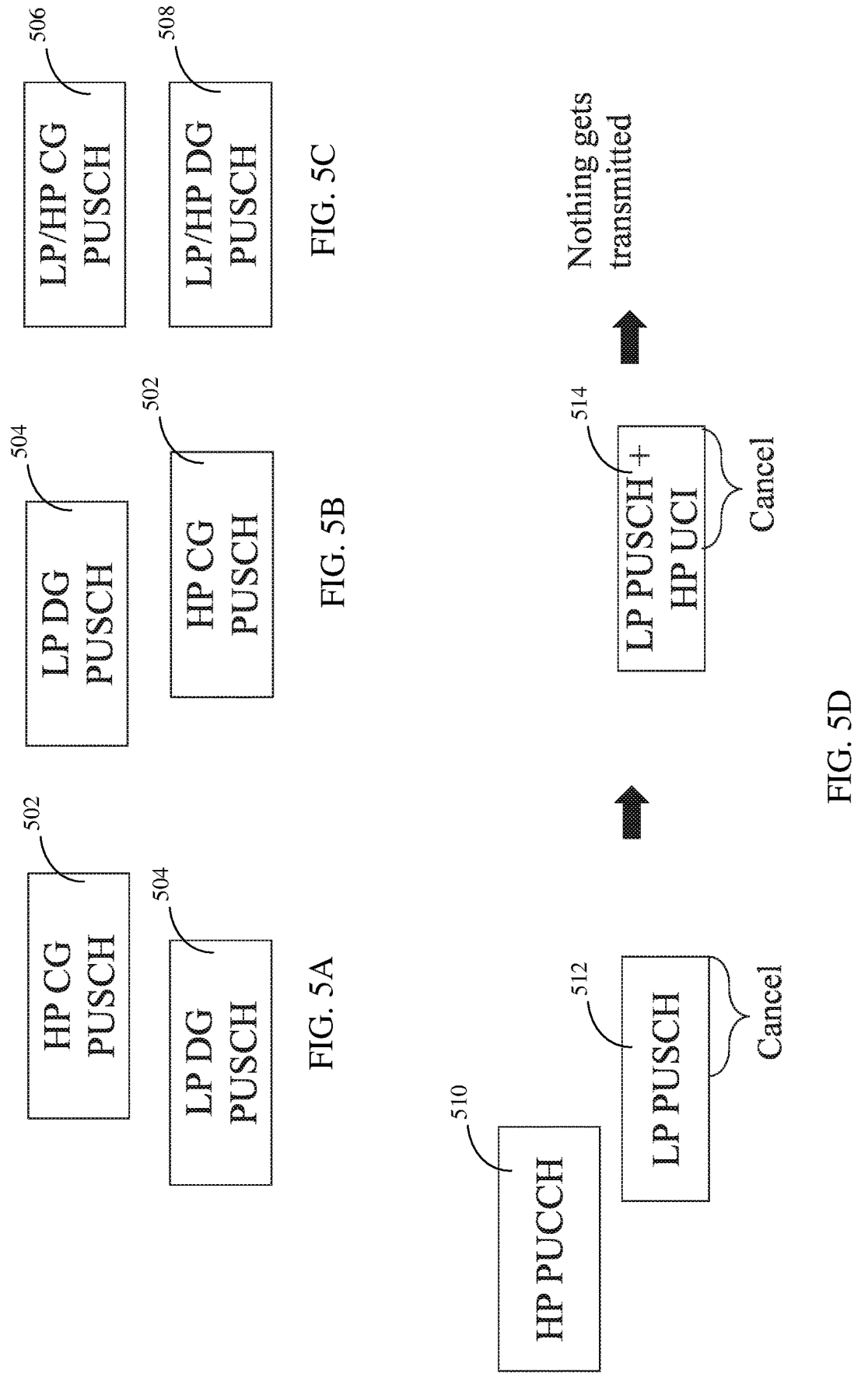
FIG. 5A, FIG. 5B, FIG. 5C, and FIG. 5D are example scenarios of overlapping uplink transmissions that may be addressed, in accordance with certain aspects of the present disclosure.

In certain cases, when a UE performs intra-UE prioritization procedures prior to cancelation, entire uplink transmissions may be unnecessarily canceled. For example, FIG. 5D illustrates an example where a high priority (HP) physical uplink control channel (PUCCH) 510 overlaps with a low priority (LP) PUSCH 512 that is subject to cancelation. After performing intra-UE prioritization, as illustrated in FIG. 5D, uplink control information (UCI) that was to be carried in the HP PUCCH is multiplexed with the LP PUSCH as shown at 514. If the cancellation is then applied to the LP PUSCH, nothing may be transmitted. Cancelation of the HP UCI may be unnecessary, however, because if the cancellation had been applied to the LP PUSCH prior to the multiplexing, the UCI could have been transmitted in the HP PUCCH.

Aspects of the present disclosure provide techniques for processing overlapping uplink transmissions that may avoid such unnecessary cancelation, for example, by detecting when an LP PUSCH might not be transmitted by performing a cancelation procedure before a prioritization/multiplexing procedure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

Figure 1:
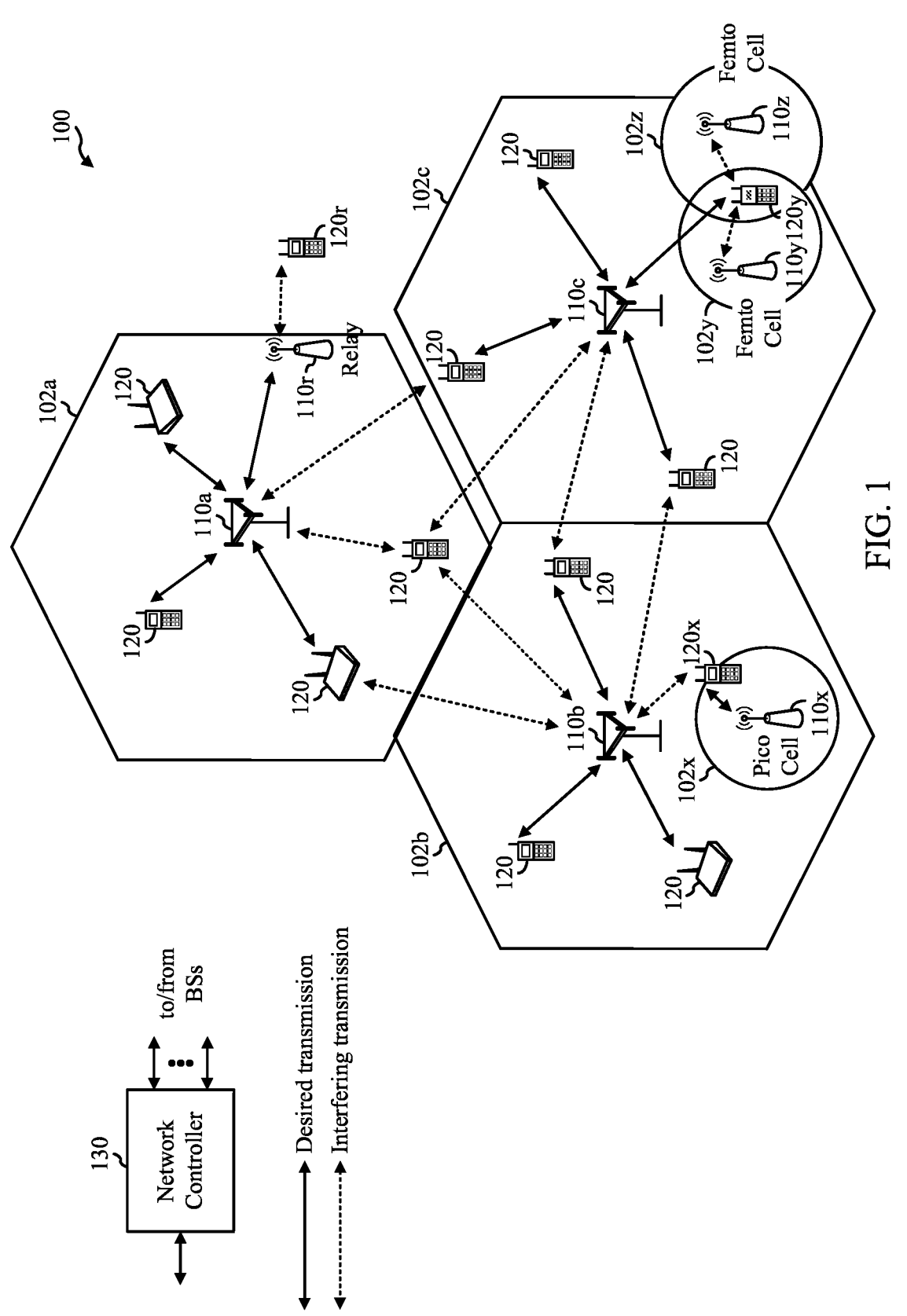
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, a UE 120 may be configured to perform operations 600 of FIG. 6 and/or FIG. 11. Similarly, a base station 110 may be configured to perform operations 700 of FIG. 7 and/or FIG. 12.

As illustrated in FIG. 1, the wireless communication network 100 may include a number of base stations (BSs) 110 and other network entities. As used herein, BS and network entity may be interchangeable terms when referring to a wireless communication entity. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
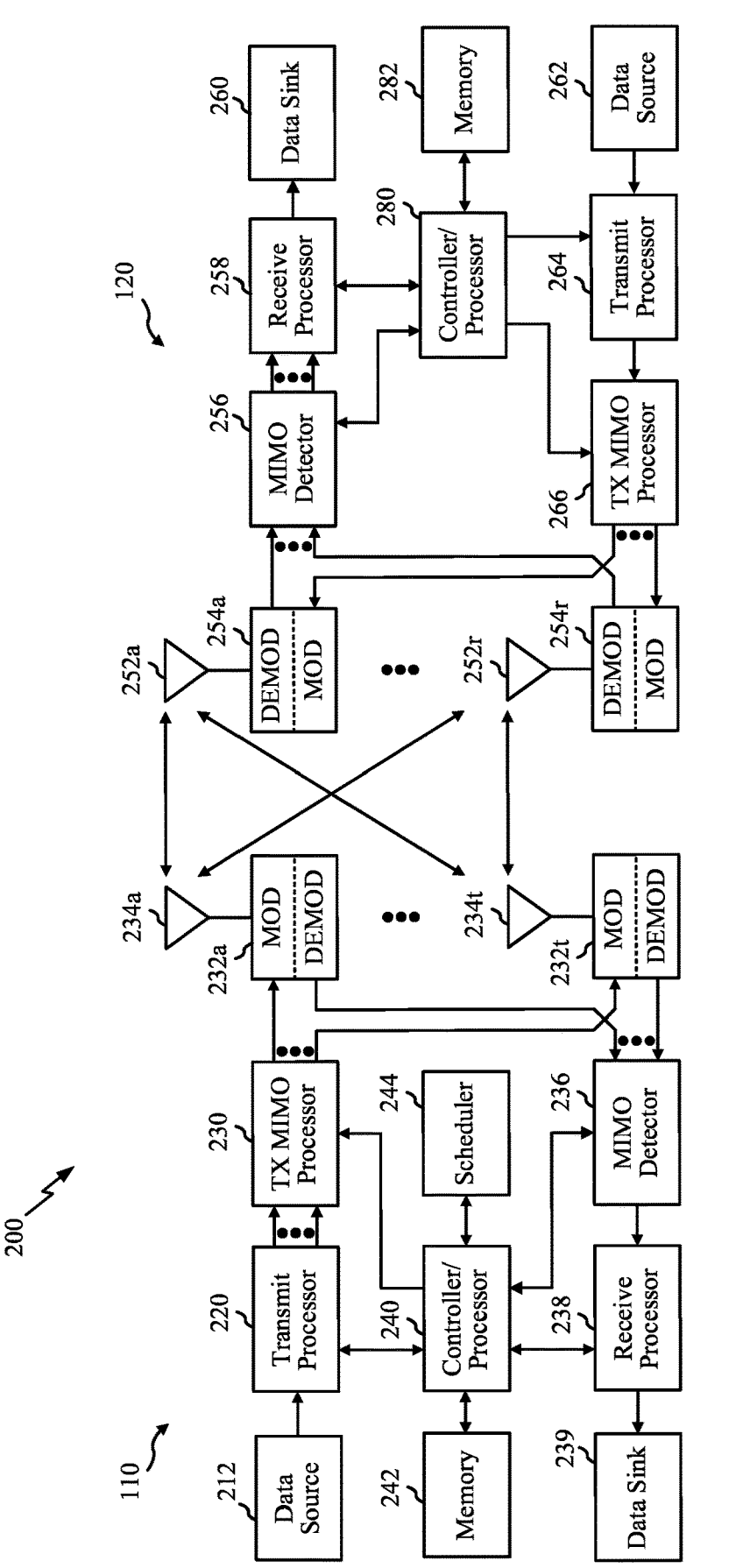
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 may be configured to perform the operations described with respect to FIG. 6, while similar processors of BS 110 may perform operations described with respect to FIG. 7.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DE-MODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

In various aspects, a network entity or network node can be implemented as an aggregated base station, as a disaggregated base station, a component of a base station, an integrated access and backhaul (IAB) node, a relay node, a sidelink node, to name a few examples.

The disaggregated base station architecture may include one or more central units (CUs) that can communicate directly with a core network via a backhaul link, or indirectly with the core network through one or more disaggregated base station units (such as a Near-Real Time (Near-RT) RAN Intelligent Controller (RIC) via an E2 link, or a Non-Real Time (Non-RT) RIC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs 104 via one or more radio frequency (RF) access links. In some implementations, the UE 104 may be simultaneously served by multiple RUs.

Each of the units, e.g., the CUs, the DUs, the RUs, as well as the Near-RT RICs, the Non-RT RICs and the SMO Framework, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (e.g., Central Unit-User Plane (CU-UP)), control plane functionality (e.g., Central Unit-Control Plane (CU-CP)), or a combination thereof. In some implementations, the CU can be logically split into one or more CU-UP units and one or more CU-CP units. The CU-UP unit can communicate bidirectionally with the CU-CP unit via an interface, such as the E1 interface when implemented in an O-RAN configuration. The CU can be implemented to communicate with the DU, as necessary, for network control and signaling.

The DU may correspond to a logical unit that includes one or more base station functions to control the operation of one or more RUs. In some aspects, the DU may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU may further host one or more low PHY layers. Each layer (or module) can be implemented with an interface configured to communicate signals with other layers (and modules) hosted by the DU, or with the control functions hosted by the CU.

Lower-layer functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) can be implemented to handle over the air (OTA) communications with one or more UEs 104. In some implementations, real-time and non-real-time aspects of control and user plane communications with the RU(s) can be controlled by the corresponding DU. In some scenarios, this configuration can enable the DU(s) and the CU to be implemented in a cloud-based RAN architecture, such as a vRAN architecture.

The SMO Framework may be configured to support RAN deployment and provisioning of non-virtualized and virtualized network elements. For non-virtualized network elements, the SMO Framework may be configured to support the deployment of dedicated physical resources for RAN coverage requirements which may be managed via an operations and maintenance interface (such as an O1 interface). For virtualized network elements, the SMO Framework may be configured to interact with a cloud computing platform (such as an open cloud (O-Cloud)) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework can communicate with a hardware aspect of a 4G RAN, such as an open eNB (O-eNB), via an O1 interface. Additionally, in some implementations, the SMO Framework can communicate directly with one or more RUs via an O1 interface. The SMO Framework also may include a Non-RT RIC configured to support functionality of the SMO Framework.

The Non-RT RIC may be configured to include a logical function that enables non-real-time control and optimization of RAN elements and resources, Artificial Intelligence/ Machine Learning (AI/ML) workflows including model training and updates, or policy-based guidance of applications/features in the Near-RT RIC. The Non-RT RIC may be coupled to or communicate with (such as via an A1 interface) the Near-RT RIC. The Near-RT RIC may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC.

In some implementations, to generate AI/ML models to be deployed in the Near-RT RIC, the Non-RT RIC may receive parameters or external enrichment information from external servers. Such information may be utilized by the Near-RT RIC and may be received at the SMO Framework or the Non-RT RIC from non-network data sources or from network functions. In some examples, the Non-RT RIC or the Near-RT RIC may be configured to tune RAN behavior or performance. For example, the Non-RT RIC may monitor long-term trends and patterns for performance and employ AI/ML models to perform corrective actions through the SMO Framework (such as reconfiguration via O1) or via creation of RAN management policies (such as A1 policies).

Figure 3:
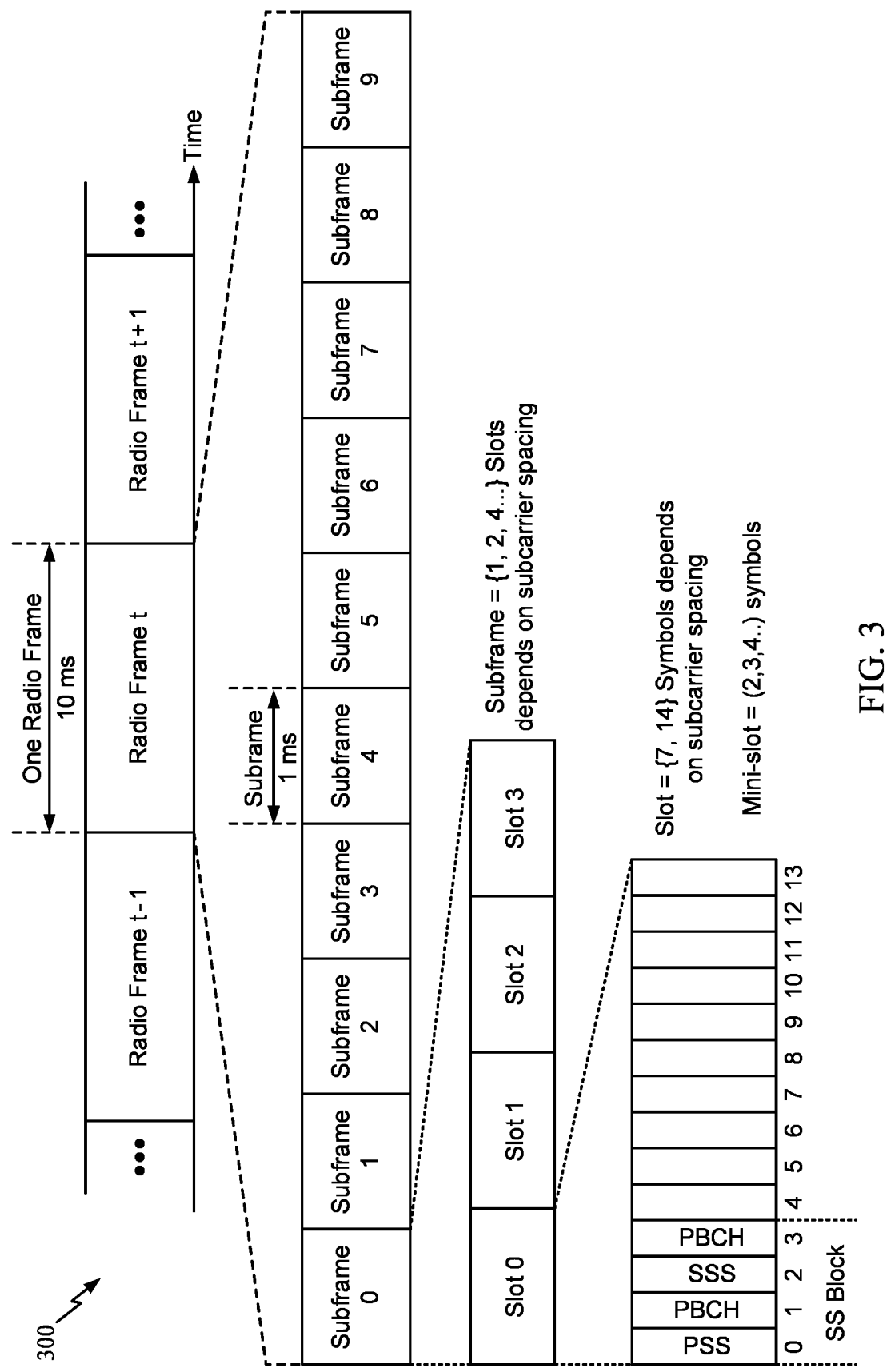
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Factors that Impact the Transmission of Uplink Channels

In certain systems (e.g., in NR R-16), uplink transmissions can be associated with either high (aka, priority index1) or low priority (aka, priority index 0). If a high priority (HP) channel and a low priority (LP) channel overlap in time, then the UE may be configured drop the low priority channel and only transmit the high priority channel.

As noted above, this procedure may be referred to as intra-UE prioritization. Intra-UE prioritization may be useful, for example, when low priority is used for eMBB traffic, while high priority is used for ultra-reliable low latency communications (URLLC) traffic.

A UE may also apply an intra-UE multiplexing procedure in which, instead of always dropping the LP channel, the UE will multiplex the LP and HP channel into a common resource. As noted above, in NR R-17, a two-step approach to intra-UE multiplexing may be applied for handling overlapping PUCCHs/PUSCHs with different priorities. According to a first step (Step 1), the UE may resolve overlapping PUCCHs and/or PUSCHs with the same priority. According to a second step (Step 2), the UE may resolve overlapping PUCCHs and/or PUSCHs with different priorities.

As noted above, besides overlapping on uplink resources, various other factors may impact the transmission of uplink channels, such as ULCI, TDD conflicts, and conflicts between a DG PUSCH and a CG PUSCH.

ULCI, also referred to as uplink preemption indication (ULPI), allows a gNB to schedule URLLC transmissions on resources that were allocated to (other) eMBB UEs.

Uplink cancellation allows a network to prioritize certain types of traffic over other types of traffic. A network may signal a UE to cancel a portion of an already-scheduled lower priority uplink transmission to avoid interference to a higher priority uplink transmission (e.g., from another UE).

For example, when a network entity allocates resources scheduled for enhanced mobile broadband (eMBB) transmissions to an ultra-reliable low latency communication (URLLC) UE (e.g., due to latency requirements), the network entity may transmit a ULCI to the eMBB UEs to ask the eMBB UEs to stop their transmissions. When a UE detects the ULCI from the network entity, the UE stops the transmission (without resuming the transmission).

In conventional systems, ULCI is typically applicable to physical uplink shared channel (PUSCH) and sounding reference signal (SRS) transmissions. As in the example noted above, ULCI is implemented with the purpose of improving URLLC UE performance.

As illustrated in FIG. 4A, in the uplink, the gNB may use ULCI to indicate the eMBB UEs to cancel part of their transmission (that overlaps with the urgent URLLC transmission from other users). ULCI may be transmitted before the affected eMBB PUSCH transmission, such that an eMBB UE may cancel the overlapping part of its transmission after receiving the ULCI, hence not interfering with the (other UE's) URLLC transmission.

ULCI may be indicated in a DCI format 2_4, which includes a sequence of bits mapped to a sequence of time/frequency resources, where a 0 indicates that a UE is not to cancel, and a 1 indicates that a UE is to cancel. ULCI is typically always applicable to low priority PUSCH and SRS, and gNB can semi-statically configure the UE to indicate whether the UE is to apply the ULCI to a high priority PUSCH. Conventionally, ULCI does not apply to PUCCH.

In NR, a UE may also need to cancel an uplink transmission if that uplink transmission overlaps with certain symbols. For example, as illustrated in FIG. 4B, a UE may cancel an uplink transmission if it overlaps with semi-static DL symbols. Such symbols may be determined from: 1) symbols indicated as downlink by TDD-ConfigurationCommon or TDD-UL-DL-ConfigDedicated, 2) symbols that are indicated to the UE by ssb-PositionInBurst in SIB1 or ssb-PositionInBurst in ServingCellConfigCommon for reception of SSB/PBCH blocks, or 3) symbols that are indicated to the UE to receive CORESET 0 or CORESET for Type0-PDCCH CSS set.

A UE may cancel an uplink transmission if it overlaps with semi-static 'flexible' symbols, but later switched to DL symbols by a dynamic scheduling DCI for the UE to receive a dynamic PDSCH (in a downlink grant) or CSI-RS (in an uplink or downlink grant). A UE may cancel an uplink transmission if it overlaps with semi-static flexible symbols, but later switched to "DL" or "flexible" by a dynamic slot format indicator (SFI), which is DCI format 2_0. In addition, a UE may cancel an uplink transmission if it overlaps with semi-static flexible symbols and if the UE does not detect an SFI (and is, thus, unsure how symbols may be configured).

In some cases, such as those illustrated in FIGS. 5A-5C, a UE may need to cancel one of the CG/DG PUSCH transmissions and transmit the other one. In some systems, a set of rules may be defined to let the UE determine which one to cancel and which one to keep.

In NR R-16, multiplexing across different priorities may not be allowed. Instead, if a high priority (HP) channel and a low priority (LP) channel overlap in time, then the UE will drop the low priority and only transmit the high priority channel.

One way to perform the intra-UE UL multiplexing and UL cancellation in NR Rel-17 is to perform the intra-UE multiplexing prior to UL cancellation. In this case, the UE will first resolve intra-UE UL channel overlapping, and then cancel any remaining channel due to ULCI or TDD or CG/DG conflict. As in the example shown in FIG. 5D, the UE would first piggyback HP UCI (uplink control information) to the LP PUSCH, and then cancel the LP PUSCH and the HP UCI due to ULCI/TDD.

In this case, neither the HP PUCCH nor LP PUSCH can be transmitted, resulting in unnecessarily cancellations. The UE could attempt to reinstate the HP PUCCH, after it detects that the LP PUSCH cannot be transmitted. This may not be implementable in practice, however, since at the time that the UE decides to cancel the LP PUSCH, there may not be sufficient time to re-prepare the HP PUCCH.

Example Procedures for Processing Overlapping Uplink Transmissions

Aspects of the present disclosure provide techniques for processing overlapping uplink transmissions that may avoid such unnecessary cancelation, for example, by detecting when an LP PUSCH might not be transmitted by performing a cancelation procedure before a prioritization/multiplexing procedure.

FIG. 6 illustrates example operations 600 for wireless communication, in accordance with certain aspects of the present disclosure. The operations 600 may be performed, for example, by a UE (e.g., such as a UE 120a in the wireless communication network 100) to process overlapping uplink transmissions.

Operations 600 begin, at 602, by identifying overlapping uplink transmissions. For example, the UE may identify one of the scenarios illustrated in FIGS. 5A-5D, FIGS. 8A-8B, or FIGS. 9-10.

At 604, the UE performs a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities. At 606, the UE transmits at least one of the overlapping uplink transmissions after performing the cancelation procedure.

FIG. 7 illustrates example operations 700 for wireless communication by a network entity and may be considered complementary to operations 700 of FIG. 7. For example, operations 700 may be performed by a BS 110.

Operations 700 begin, at 702, by identifying overlapping uplink transmissions of a UE. At 704, the network entity determines that the UE will perform a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities. At 706, the network entity processes at least one of the overlapping uplink transmissions from the UE in accordance with the determination.

As proposed herein, if a UE identifies two or more overlapping uplink transmissions, it may perform a cancellation procedure that might be considered a clean-up step before executing the two-step intra-UE multiplexing procedure described above.

The cancelation procedure may be considered a preliminary step (step 0) as follows. In some cases, if the UE receives a ULCI to cancel one or more of PUSCHs involved in the collision, then the UE may cancel these PUSCHs (before performing the intra-UE multiplexing procedure).

In some cases, if one or more of the uplink transmissions has a TDD conflict (e.g., the transmission conflicts with either dynamic or semi-static DL as explained above with reference to FIG. 4D), then these uplink transmissions may be cancelled first (before performing the intra-UE multiplexing procedure).

In some cases, if the two or more uplink transmissions includes at least 1 CG PUSCH and 1 DG PUSCH that the UE is not allowed to transmit simultaneously (e.g., if they are overlapping and are scheduled on the same serving cell), then the UE may first cancel one of the CG PUSCH or DG PUSCH (i.e., resolve collision between the CG PUSCH and DG PUSCH).

Figure 8A:
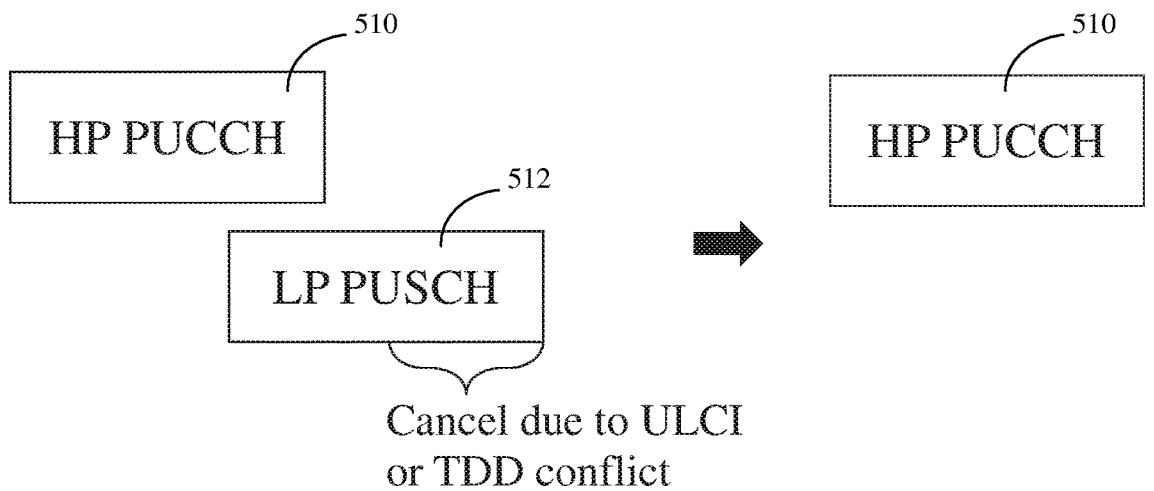
FIG. 8A and FIG. 8B are example scenarios in which overlapping uplink transmissions may be processed, in accordance with certain aspects of the present disclosure.

FIG. 8A illustrates one example of how the techniques presented herein may avoid the unnecessary cancelation resulting in the procedure illustrated in FIG. 5D. As with the example of FIG. 5D, the example of FIG. 8A also shows an HP PUCCH 510 that overlaps with an LP PUSCH 512. In this case, however, the UE first cancels the LP PUSCH (e.g., in Step 0) before performing the intra-UL multiplexing. After canceling the LP PUSCH, there are no more overlapping uplink transmissions. Therefore, the UE will transmit the HP PUCCH, avoiding the unnecessary cancelation of the HP uplink channel (UCH) shown in FIG. 5C.

Figure 8B:
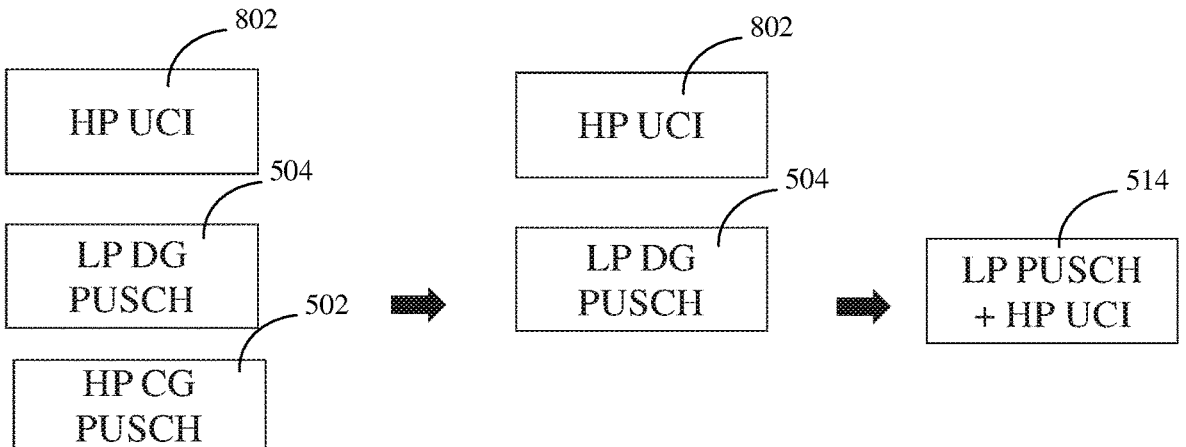

FIG. 8B illustrates another example of how the techniques presented herein may applied to process overlapping uplink transmissions. In this example, the UE first resolves the collision between the LP DG PUSCH 504 and the HP CG PUSCH 502, determining that the LP DG PUSCH is to be transmitted (if there is no data to be transmitted on HP CG) and HP CG PUSCH is to be dropped. When performing intra-UE multiplexing, the UE may decide to piggyback the HP UCI 802 on the LP PUSCH as shown at 514.

In contrast, had the UE performed Step 1 and Step 2 of the intra-UE multiplexing, without considering cancelation first (step 0), the UE may have first put the HP UCI on the HP CG PUSCH in Step 1, and then it may have canceled the HP CG PUSCH (including the HP UCI), and only transmitted the LP PUSCH. Thus, the HP UCI would have unfortunately been dropped if the UE had processed the overlapping uplink transmissions according to the conventional approach.

In some cases, the UE may perform an intermediate step between Step 1 and Step 2 of the (in this case, the intermediate step may be considered Step 1.5), to resolve the conflicts due to ULCI or TDD. In other words, the UE may first (perform step 1 to) resolve overlapping PUCCHs and/or PUSCHs with the same priority. The UE may then (perform Step 1.5 to) cancel any remaining channel (from Step 1) that is in conflict with ULCI or TDD pattern. Finally, the UE may then (perform Step 2 to) resolve overlapping PUCCHs and/or PUSCHs with different priorities (that survive after Step 1.5).

Figure 9:
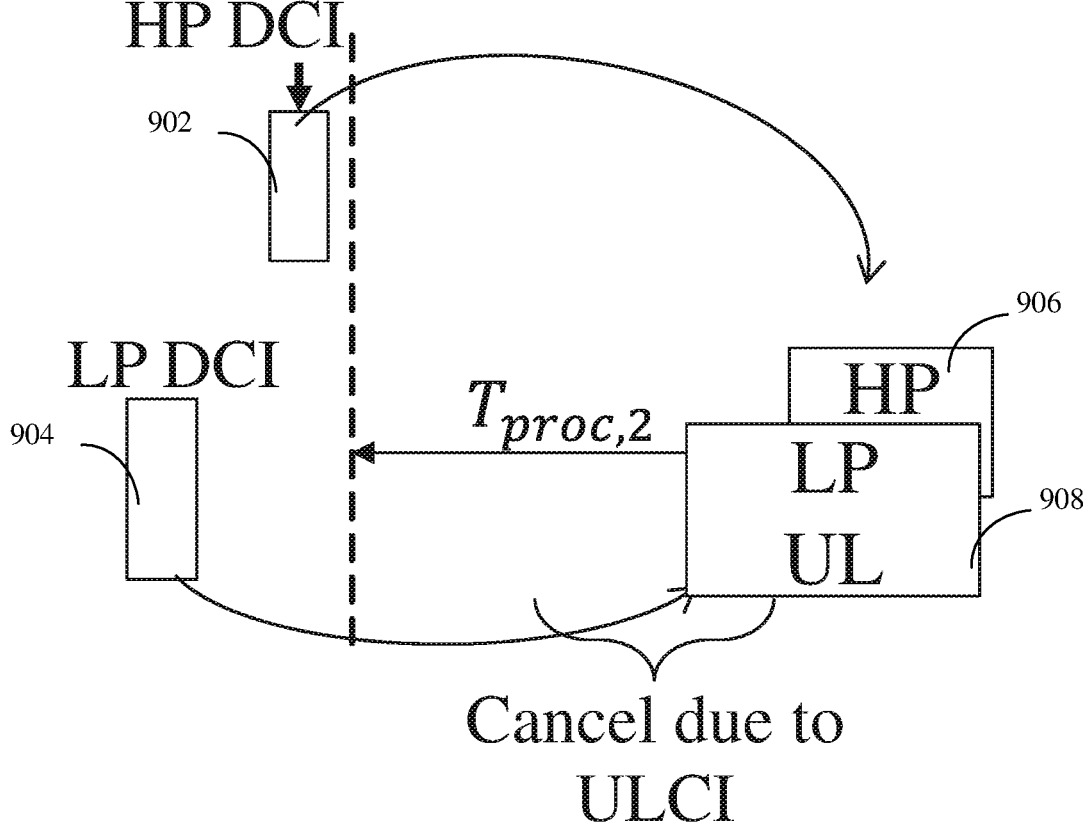
FIG. 9 and FIG. 10 are example scenarios in which overlapping uplink transmissions may be processed, in accordance with certain aspects of the present disclosure.

In some cases, the indication for cancellation (e.g., due to ULCI or due to dynamic SFI/dynamic DL grant) may come very late, and there may not be enough time for the UE perform step 0 before performing step 1 and/or step 2. As illustrated in FIG. 9, in some cases, a DCI indicating ULCI (e.g., HP DCI 902 and/or LP DCI 904) may need to occur some specified time ($T_{proc,2}$) before the uplink transmissions to which the ULCI applies (e.g., HP UL 906 and LP UL 908).

For example, in order to perform Step 1 and Step 2, the grants for all the overlapping channels may need to arrive a threshold number of symbols prior to the earliest starting symbol of the group of overlapping UL channels, the latest time in which a new grant can arrive (also known as the "multiplexing deadline"). However, the ULCI or dynamic SFI/dynamic DL grant do not need to arrive before the multiplexing deadline.

According to certain aspects of the present disclosure, however, ULCI may be applied after resolving the overlapping UL channels as in Step 1 and Step 2. In addition, if the UE is configured by the gNB (e.g., via RRC signaling) to only apply the ULCI to low priority PUSCH (not to high priority PUSCH), then the UE may not apply the ULCI to a LP PUSCH that contains any HP UCI.

In other words, the LP PUSCH with HP UCI is treated by the UE as a high priority transmission in terms of cancellation by ULCI. However, if the gNB configures the UE also to cancel HP PUSCH by ULCI, then the UE may still cancel the LP PUSCH with HP UCI.

Example Procedures for Processing Overlapping Uplink Transmissions

Aspects of the present disclosure provide techniques for determining payload size of HARQ-ACK when multiplexed in a same PUSCH.

In some systems, such as NR Rel-15, a gNB may indicate the HARQ-ACK payload size (e.g., for a type-II HARQ-ACK codebook) using an uplink total downlink assignment indication (DAI) field in the UL grant for a PUSCH, in case the UE needs to piggyback/multiplex the HARQ-ACK on the PUSCH.

Figure 10:
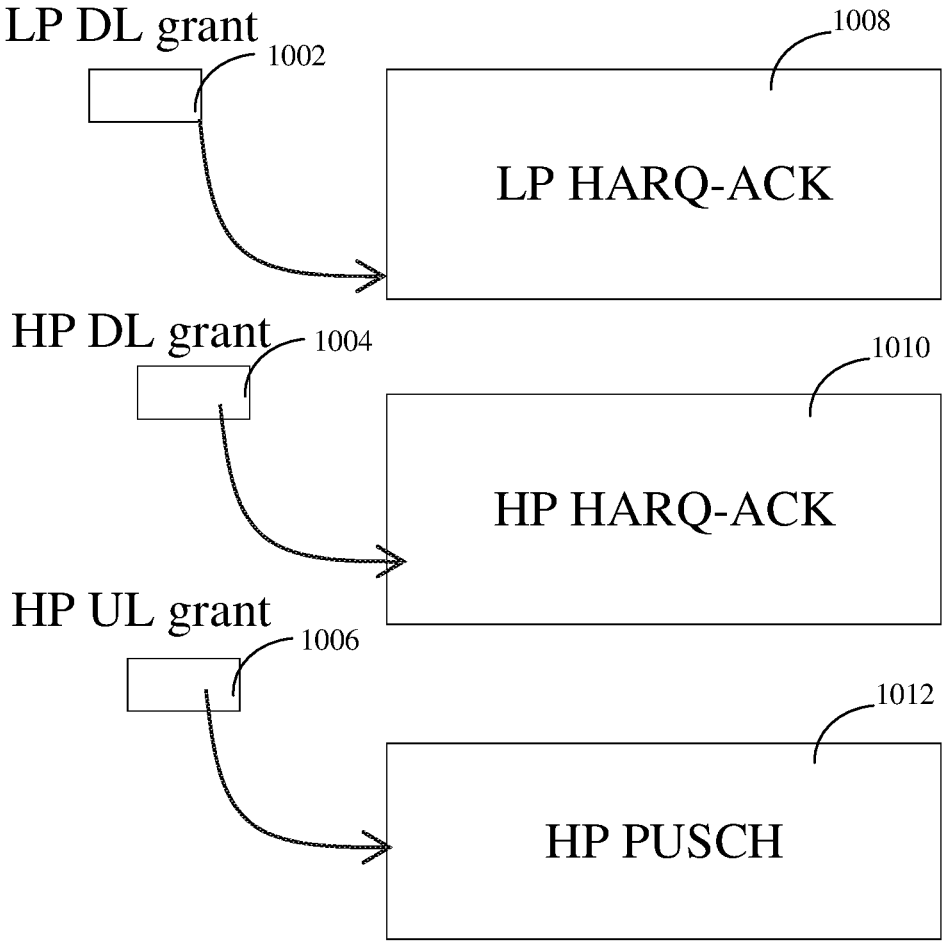

This may present an issue, for example, in the scenario shown in FIG. 10 where both HP HARQ-ACK 1010 and LP HARQ-ACK 1008 (corresponding to HP DL grant 1004 and LP DL grant 1002, respectively) need to be multiplexed on a PUSCH 1012 (either HP or LP). The issue relates to how the gNB should indicate the HARQ-ACK payload size for both HP and LP HARQ-ACK. A simple approach would be to configure 2 DAI fields in the UL grant 1006, 1 for HP HARQ-ACK, 1 for LP HARQ-ACK. This simple approach is not very efficient, since the probability of UE transmitting both HP and LP HARQ-ACK on a PUSCH is very small and, most of the time, the added DAI field would be wasted.

Aspects of the present disclosure provide techniques for efficiently indicating payload size for both HP and LP HARQ-ACK when multiplexed in a same PUSCH.

FIG. 11 illustrates example operations 1100 for wireless communication, in accordance with certain aspects of the present disclosure. The operations 1100 may be performed, for example, by a UE (e.g., such as a UE 120a in the wireless communication network 100) to determine payload size for LP and HP HARQ-ACK multiplexed in a PUSCH.

Operations 1100 begin, at 1102, by identifying overlapping uplink transmissions, wherein the overlapping uplink transmissions comprise first acknowledgment feedback for downlink transmissions of a first priority and second acknowledgment feedback for downlink transmissions of a second priority.

At 1104, the UE decides to multiplex the first acknowledgment feedback and second acknowledgment feedback in a physical uplink shared channel (PUSCH). At 1106, the UE determines payload sizes for the first acknowledgment feedback and second acknowledgment feedback based on a first downlink assignment indicator (DAI) and a second DAI. At 1108, the UE transmits the first acknowledgment feedback and second acknowledgment feedback in the PUSCH, in accordance with the determined payload sizes.

FIG. 12 illustrates example operations 1200 for wireless communication by a network entity and may be considered complementary to operations 1200 of FIG. 12. For example, operations 700 may be performed by a BS 110.

Operations 1200 begin, at 1202, by identifying overlapping uplink transmissions, wherein the overlapping uplink transmissions comprise first acknowledgment feedback for downlink transmissions of a first priority and second acknowledgment feedback for downlink transmissions of a second priority. At 1204, the network entity determines that the UE will multiplex the first acknowledgment feedback and second acknowledgment feedback in a physical uplink shared channel (PUSCH), with payload sizes for the first acknowledgment feedback and second acknowledgment feedback determined based on a first downlink assignment indicator (DAI) and a second DAI. At 1206, the network entity processes the first acknowledgment feedback and second acknowledgment feedback multiplexed in the PUSCH, in accordance with the determined payload sizes.

According to aspects of the present disclosure, the number of DAI fields in the UL grant may not need to be increased. For example, instead, the UE may use the DL DAI indicated in the HP DL grant to determine the HP HARQ-ACK payload size, and use the UL DAI indicated in the UL grant to determine the LP HARQ-ACK payload size.

This approach may be beneficial, because LP DCI is typically less reliable than the HP DCI. Hence, missing HP DCI may be less likely than missing the LP DCI. The UL DAI referred to here is the DAI in the UL grant (the UL grant that schedules the PUSCH transmission), and the DL DAI is the DAI in the DL grant (the DL grant that schedules/results in the HARQ-ACK feedback).

In some cases, however, UL DAI may be used for the HP HARQ-ACK payload size, while DL DAI in the LP grant may be used for LP HARQ-ACK payload size. In some cases, the techniques proposed herein may be conditionally applied. For example, in some cases, the techniques proposed herein may be conditionally applied only when the PUSCH is an HP PUSCH, or only when the PUSCH is a LP PUSCH.

Figure 13:
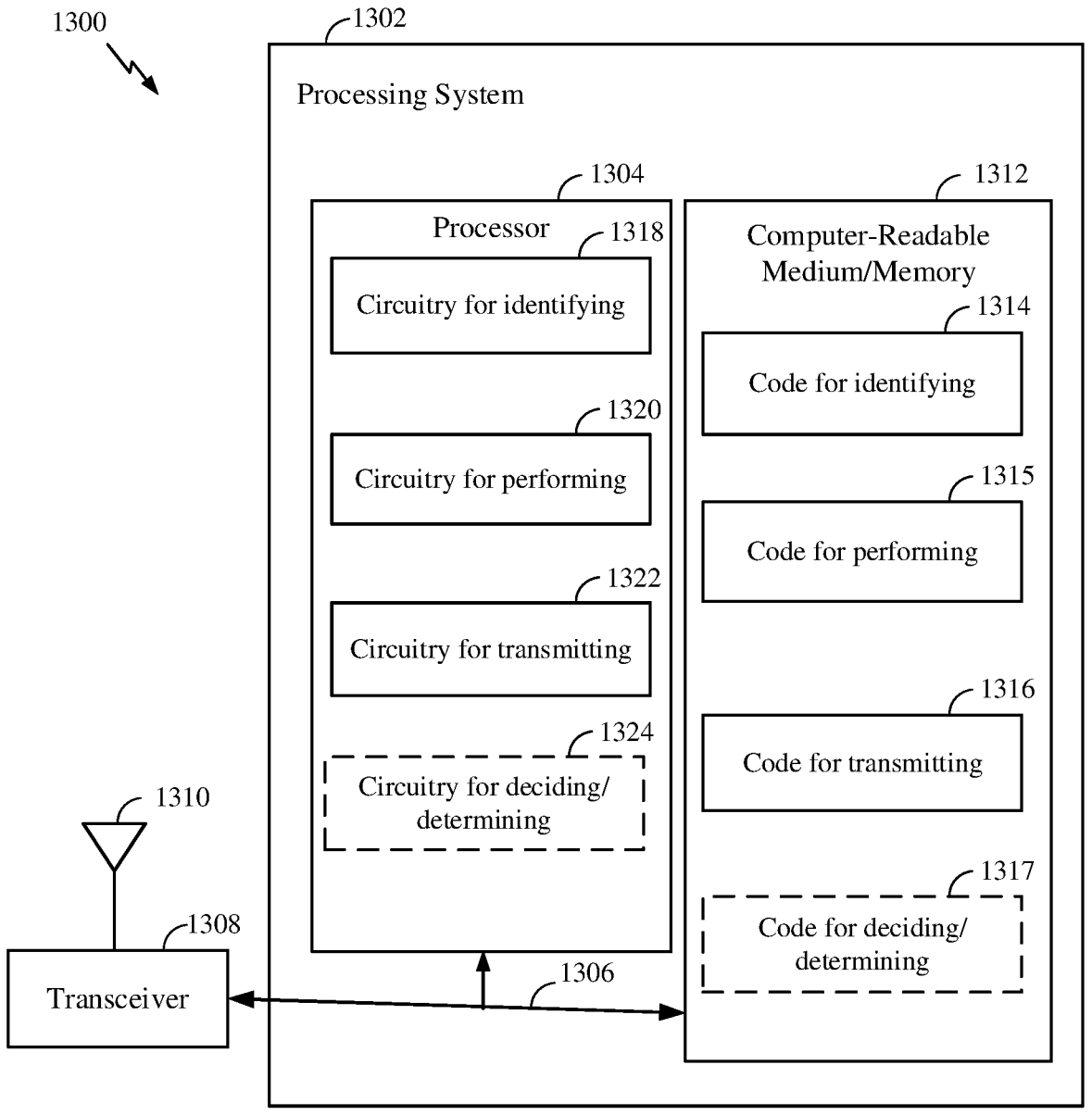
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 6 and/or FIG. 11. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 6 and/or FIG. 11, or other operations for performing the various techniques discussed herein. In certain aspects, computer-readable medium/memory 1312 stores code 1314 for identifying; code 1315 for identifying; and code 1316 for transmitting, and code 1317 for deciding and/or determining. In certain aspects, the processor 1304 has circuitry configured to implement the code stored in the computer-readable medium/memory 1312. The processor 1304 includes circuitry 1318 for identifying; circuitry 1320 for performing; circuitry 1322 for transmitting; and circuitry 1324 for deciding and/or determining.

Figure 14:
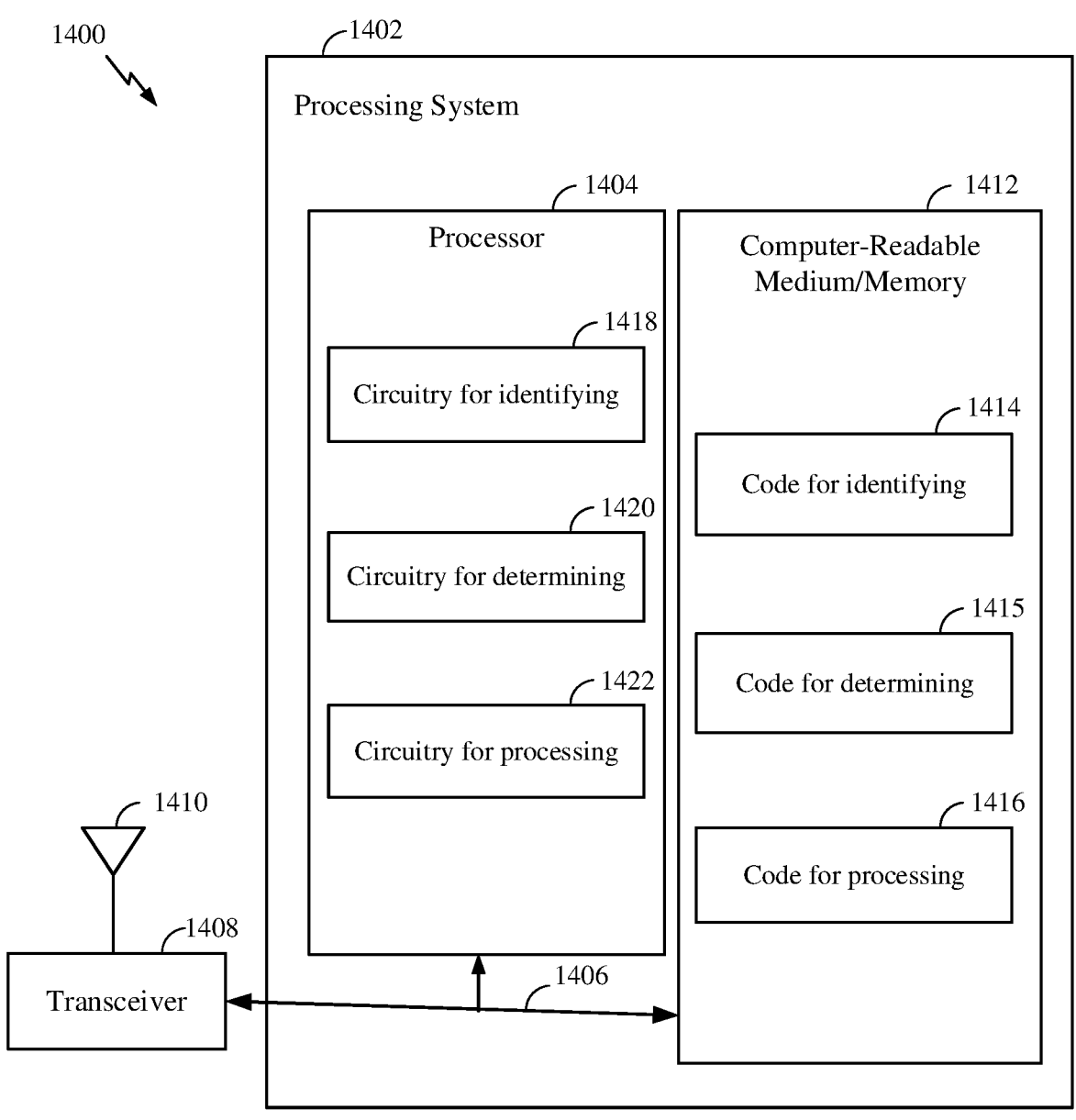
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 7 and/or FIG. 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 7 and/or FIG. 12, or other operations for performing the various techniques discussed herein. In certain aspects, computer-readable medium/memory 1412 stores code 1414 for identifying; code 1415 for determining; and code 1416 for processing. In certain aspects, the processor 1404 has circuitry configured to implement the code stored in the computer-readable medium/memory 1412. The processor 1404 includes circuitry 1418 for identifying; circuitry 1420 for determining; and code 1422 for processing.

EXAMPLE CLAUSES

Implementation examples are described in the following numbered clauses:

Clause 1: A method for wireless communication by a user equipment (UE), comprising: identifying overlapping uplink transmissions; performing a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities; and transmitting at least one of the overlapping uplink transmissions after performing the cancelation procedure.

Clause 2: The method of Clause 1, wherein the UE performs the cancelation procedure before performing either of the first step or the second step of the multiplexing procedure.

Clause 3: The method of Clause 2, wherein: performing the cancelation procedure comprises canceling a first physical uplink shared channel (PUSCH); and at least one of the factors comprises receipt, by the UE, of an uplink cancelation indication (ULCI) indicating at least a portion the first PUSCH should be cancelled.

Clause 4: The method of Clause 2, wherein performing the cancelation procedure comprises canceling at least one overlapping uplink transmissions having a time division duplexed (TDD) conflict with one or more dynamic or semi-static downlink symbols.

Clause 5: The method of Clause 2, wherein: at least one of the factors comprises the overlapping uplink transmissions include at least one configured grant (CG) physical uplink shared channel (PUSCH) and at least one dynamic grant (DG) PUSCH; and performing the cancelation procedure comprises canceling the CG PUSCH or the DG PUSCH.

Clause 6: The method of any one of Clauses 1-5, wherein the UE performs the cancelation procedure after performing the first step of the multiplexing procedure and before performing the second step of the multiplexing procedure.

Clause 7: The method of Clause 6, wherein performing the cancelation procedure comprises canceling at least a portion of an uplink channel remaining after performing the first step to resolve overlapping uplink transmissions with the same priority.

Clause 8: The method of Clause 6, wherein the UE performs the second step to resolve overlapping uplink transmissions with different priorities remaining after performing the cancelation procedure.

Clause 9: The method of any one of Clauses 1-8, wherein the UE performs the cancelation procedure after performing at least one of the first step or the second step of the multiplexing procedure.

Clause 10: The method of Clause 9, wherein: performing the second step results in including uplink control information (UCI) of a first priority in a physical uplink shared channel (PUSCH) of a second priority; and the PUSCH of the second priority including the UCI of the first priority remains after performing the cancelation procedure if the UE is configured to apply an uplink cancelation indication (ULCI) only to uplink transmissions of the second priority.

Clause 11: The method of Clause 9, wherein: performing the second step results in including uplink control information (UCI) of a first priority in a physical uplink shared channel (PUSCH) of a second priority; and performing the cancelation procedure comprises canceling the PUSCH of the second priority including the UCI of the first priority if the UE is configured to apply an uplink cancelation indication (ULCI) to uplink transmissions of the first priority.

Clause 12: A method for wireless communication by a network entity, comprising: identifying overlapping uplink transmissions of a user equipment (UE); determining that the UE will perform a cancelation procedure involving at least one of the overlapping uplink transmissions based on one or more factors, before or after performing at least one of a first step of a multiplexing procedure to resolve overlapping uplink transmissions with a same priority or a second step of the multiplexing procedure to resolve overlapping uplink transmissions with different priorities; and processing at least one of the overlapping uplink transmissions from the UE in accordance with the determination.

Clause 13: The method of Clause 12, wherein the network entity determines that the UE performs the cancelation procedure before performing either of the first step or the second step of the multiplexing procedure.

Clause 14: The method of any one of Clauses 12-13, wherein: at least one of the factors comprises the overlapping uplink transmissions include at least one configured grant (CG) physical uplink shared channel (PUSCH) and at least one dynamic grant (DG) PUSCH; and performing the cancelation procedure comprises canceling the CG PUSCH or the DG PUSCH.

Clause 15: The method of any one of Clauses 12-14, wherein the network entity determines that the UE performs the cancelation procedure after performing the first step of the multiplexing procedure and before performing the second step of the multiplexing procedure.

Clause 16: The method of Clause 15, wherein the network entity determines that the UE performs the second step to resolve overlapping uplink transmissions with different priorities remaining after performing the cancelation procedure.

Clause 17: The method of any one of Clauses 12-16, wherein the network entity determines that the UE performs the cancelation procedure after performing at least one of the first step or the second step of the multiplexing procedure.

Clause 18: A method for wireless communication by a user equipment (UE), comprising: identifying overlapping uplink transmissions, wherein the overlapping uplink transmissions comprise first acknowledgment feedback for downlink transmissions of a first priority and second acknowledgment feedback for downlink transmissions of a second priority; deciding to multiplex the first acknowledgment feedback and second acknowledgment feedback in a physical uplink shared channel (PUSCH); determining payload sizes for the first acknowledgment feedback and second acknowledgment feedback based on a first downlink assignment indicator (DAI) and a second DAI; and transmitting the first acknowledgment feedback and second acknowledgment feedback in the PUSCH, in accordance with the determined payload sizes.

Clause 19: The method of Clause 18, wherein: the first DAI is conveyed in a downlink grant for the downlink transmissions of the first priority; and the second DAI is conveyed in an uplink grant for the PUSCH.

Clause 20: The method of any one of Clauses 18-19, wherein: the first priority is higher priority than the second priority; or the first priority is lower priority than second priority.

Clause 21: The method of any one of Clauses 18-20, wherein: the payload size for the first acknowledgment feedback is determined based on the first DAI conveyed in the downlink grant for the downlink transmissions of the first priority; and the payload size for the second acknowledgment feedback is determined based on the second DAI conveyed in the uplink grant for the PUSCH.

Clause 22: The method of any one of Clauses 18-21, wherein the PUSCH comprises a PUSCH of the first priority.

Clause 23: The method of any one of Clauses 18-22, wherein the PUSCH comprises a PUSCH of the second priority.

Clause 24: A method for wireless communication by a user equipment (UE), comprising: identifying overlapping uplink transmissions, wherein the overlapping uplink transmissions comprise first acknowledgment feedback for downlink transmissions of a first priority and second acknowledgment feedback for downlink transmissions of a second priority; determining that the UE will multiplex the first acknowledgment feedback and second acknowledgment feedback in a physical uplink shared channel (PUSCH), with payload sizes for the first acknowledgment feedback and second acknowledgment feedback determined based on a first downlink assignment indicator (DAI) and a second DAI; and processing the first acknowledgment feedback and second acknowledgment feedback multiplexed in the PUSCH, in accordance with the determined payload sizes.

Clause 25: The method of Clause 24, wherein: the first DAI is conveyed in a downlink grant for the downlink transmissions of the first priority; and the second DAI is conveyed in an uplink grant for the PUSCH.

Clause 26: The method of any one of Clauses 24-25, wherein: the first priority is higher priority than the second priority; or the first priority is lower priority than second priority.

Clause 27: The method of any one of Clauses 24-26, wherein: the payload size for the first acknowledgment feedback is determined based on the first DAI conveyed in the downlink grant for the downlink transmissions of the first priority; and the payload size for the second acknowledgment feedback is determined based on the second DAI conveyed in the uplink grant for the PUSCH.

Clause 28: The method of any one of Clauses 24-27, wherein the PUSCH comprises a PUSCH of the first priority.

Clause 29: The method of any one of Clauses 24-28, wherein the PUSCH comprises a PUSCH of the second priority.

Aspect 30: An apparatus for wireless communication, comprising a memory and at least one processor coupled to the memory, the memory and the at least one processor being configured to perform any of the operations of Aspects 1-29.

Aspect 31: An apparatus for wireless communication by a UE, comprising means for performing any of the operations of Aspects 1-29.

Aspect 32: A computer readable medium having instructions stored thereon for performing any of the operations of Aspects 1-29.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations and techniques described herein and illustrated in FIGS. 6, 7, 11, and/or 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communication by a user equipment (UE), comprising:
identifying overlapping uplink transmissions;
performing a cancelation procedure involving at least one of the overlapping uplink transmissions based on one or more factors, after performing a first step of a multiplexing procedure to resolve overlapping uplink transmissions with a same priority and a second step of the multiplexing procedure to resolve overlapping uplink transmissions with different priorities; and
transmitting at least one of the overlapping uplink transmissions after performing the cancelation procedure.

2. The method of claim 1, wherein:
performing the cancelation procedure comprises canceling a first physical uplink shared channel (PUSCH); and
at least one of the factors comprises receipt, by the UE, of an uplink cancelation indication (ULCI) indicating at least a portion the first PUSCH should be cancelled.

3. The method of claim 1, wherein performing the cancelation procedure comprises canceling at least one overlapping uplink transmissions having a time division duplexed (TDD) conflict with one or more dynamic or semi-static downlink symbols.

4. The method of claim 1, wherein:
at least one of the factors comprises the overlapping uplink transmissions include at least one configured grant (CG) physical uplink shared channel (PUSCH) and at least one dynamic grant (DG) PUSCH; and
performing the cancelation procedure comprises canceling the CG PUSCH or the DG PUSCH.

5. The method of claim 1, wherein:
performing the second step results in including uplink control information (UCI) of a first priority in a physical uplink shared channel (PUSCH) of a second priority; and
performing the cancelation procedure comprises canceling the PUSCH of the second priority including the UCI of the first priority if the UE is configured to apply an uplink cancelation indication (ULCI) to uplink transmissions of the first priority.

6. The method of claim 1, wherein:
performing the second step results in including uplink control information (UCI) of a first priority in a physical uplink shared channel (PUSCH) of a second priority; and the PUSCH of the second priority including the UCI of the first priority remains after performing the cancelation procedure if the UE is configured to apply an uplink cancelation indication (ULCI) only to uplink transmissions of the second priority.

7. The method of claim 1, wherein performing the cancelation procedure comprises canceling at least a portion of an uplink channel remaining after performing the first step to resolve overlapping uplink transmissions with the same priority.

8. A method for wireless communication by a user equipment (UE), comprising:
identifying overlapping uplink transmissions, wherein the overlapping uplink transmissions comprise first acknowledgment feedback for downlink transmissions of a first priority and second acknowledgment feedback for downlink transmissions of a second priority;
deciding to multiplex the first acknowledgment feedback and second acknowledgment feedback in a physical uplink shared channel (PUSCH);
determining a payload size for the first acknowledgment feedback and a payload size for the second acknowledgment feedback based on a first downlink assignment indicator (DAI) and a second DAI; and
transmitting the first acknowledgment feedback and second acknowledgment feedback in the PUSCH, in accordance with the determined payload sizes.

9. The method of claim 8, wherein:
the first DAI is conveyed in a downlink grant for the downlink transmissions of the first priority; and
the second DAI is conveyed in an uplink grant for the PUSCH.

10. The method of claim 9, wherein:
the payload size for the first acknowledgment feedback is determined based on the first DAI conveyed in the downlink grant for the downlink transmissions of the first priority; and
the payload size for the second acknowledgment feedback is determined based on the second DAI conveyed in the uplink grant for the PUSCH.

11. The method of claim 8, wherein:
the first priority is higher priority than the second priority; or
the first priority is lower priority than second priority.

12. The method of claim 8, wherein the PUSCH comprises a PUSCH of the first priority.

13. The method of claim 8, wherein the PUSCH comprises a PUSCH of the second priority.

14. A user equipment (UE) configured for wireless communication, comprising: memory comprising computer-executable instructions; and one or more processors configured, individually or collectively, to execute the computer-executable instructions and cause the UE to:
identify overlapping uplink transmissions;
perform a cancelation procedure involving at least one of the overlapping uplink transmissions based on one or more factors, after performing a first step of a multiplexing procedure to resolve overlapping uplink transmissions with a same priority and a second step of the multiplexing procedure to resolve overlapping uplink transmissions with different priorities; and
transmit at least one of the overlapping uplink transmissions after performing the cancelation procedure.

15. The UE of claim 14, wherein:
performance of the cancelation procedure comprises canceling a first physical uplink shared channel (PUSCH); and at least one of the factors comprises receipt, by the UE, of an uplink cancelation indication (ULCI) indicating at least a portion the first PUSCH should be cancelled.

16. The UE of claim 14, wherein performance of the cancelation procedure comprises canceling at least one overlapping uplink transmissions having a time division duplexed (TDD) conflict with one or more dynamic or semi-static downlink symbols.

17. The UE of claim 14, wherein:

at least one of the factors comprises the overlapping uplink transmissions include at least one configured grant (CG) physical uplink shared channel (PUSCH) and at least one dynamic grant (DG) PUSCH; and performance of the cancelation procedure comprises canceling the CG PUSCH or the DG PUSCH.

18. The UE of claim 14, wherein:

performance of the second step results in including uplink control information (UCI) of a first priority in a physical uplink shared channel (PUSCH) of a second priority; and performance of the cancelation procedure comprises canceling the PUSCH of the second priority including the UCI of the first priority if the UE is configured to apply an uplink cancelation indication (ULCI) to uplink transmissions of the first priority.

19. The UE of claim 14, wherein:

performance of the second step results in including uplink control information (UCI) of a first priority in a physical uplink shared channel (PUSCH) of a second priority; and the PUSCH of the second priority including the UCI of the first priority remains after performing the cancelation procedure if the UE is configured to apply an uplink cancelation indication (ULCI) only to uplink transmissions of the second priority.

20. A user equipment (UE) configured for wireless communication, comprising: memory comprising computer-executable instructions; and one or more processors config- ured, individually or collectively, to execute the computer-executable instructions and cause the UE to:

identify overlapping uplink transmissions, wherein the overlapping uplink transmissions comprise first acknowledgment feedback for downlink transmissions of a first priority and second acknowledgment feedback for downlink transmissions of a second priority;

decide to multiplex the first acknowledgment feedback and second acknowledgment feedback in a physical uplink shared channel (PUSCH);

determine a payload size for the first acknowledgment feedback and a payload size for the second acknowledgment feedback based on a first downlink assignment indicator (DAI) and a second DAI; and transmit the first acknowledgment feedback and second acknowledgment feedback in the PUSCH, in accordance with the determined payload sizes.

21. The UE of claim 20, wherein:

the first DAI is conveyed in a downlink grant for the downlink transmissions of the first priority; and the second DAI is conveyed in an uplink grant for the PUSCH.

22. The UE of claim 21, wherein:

the payload size for the first acknowledgment feedback is determined based on the first DAI conveyed in the downlink grant for the downlink transmissions of the first priority; and the payload size for the second acknowledgment feedback is determined based on the second DAI conveyed in the uplink grant for the PUSCH.

23. The UE of claim 20, wherein:

the first priority is higher priority than the second priority; or the first priority is lower priority than second priority.

* * * * *